United States Patent [19]

Schmidt

[11] B 3,921,170

[45] Nov. 18, 1975

[54] METHOD AND SYSTEM FOR COMPUTING ALTITUDE OVER A TARGET AND THE HORIZONTAL RANGE THEREOF

[75] Inventor: Donald J. Schmidt, Laurel, Md.

[73] Assignee: The United States of America as represented by the Secretary of the Air Force, Washington, D.C.

[22] Filed: July 31, 1972

[21] Appl. No.: 278,491

[44] Published under the Trial Voluntary Protest Program on January 28, 1975 as document no. B 278,491.

[52] U.S. Cl...... 343/12 A; 235/61.5 D; 235/150.26; 343/7 ED
[51] Int. Cl.[2] ........................................... G01S 9/04
[58] Field of Search.. 343/7 ED, 12 A, 12 R, 5 CM; 235/61.5 D, 150.26

[56] References Cited
UNITED STATES PATENTS

| | | | |
|---|---|---|---|
| 2,454,673 | 11/1948 | Sanders, Jr. | 343/7 ED |
| 2,988,960 | 6/1961 | Helgeson et al. | 343/7 ED |
| 2,995,984 | 8/1961 | Helgeson et al. | 343/7 ED |

Primary Examiner—Maynard R. Wilbur
Assistant Examiner—G. E. Montone
Attorney, Agent, or Firm—Joseph E. Rusz; Julian L. Siegel

[57] ABSTRACT

Horizontal range X and altitude over a target $h$ during bomb delivery from an aircraft at a present time $t$ is computed by first determining horizontal range over the target $X_o$ at time of acquisition $t_o$ from the relationship $$X_o = X + \int_{t_o}^{t} V_N \cos(\psi + A)\, dt + \int_{t_o}^{t} V_E \sin(\psi + A)\, dt$$

in which the azimuth angle A of the target relative to the aircraft heading and the aircraft heading at a present time $t$ is supplied by a mapping radar and a heading reference source respectively. $V_N$ and $V_E$ represent respectively the north and east components of the aircraft's velocity supplied by a ground velocity data source. An updated estimate of the altitude, $h_o'$, over the target at the time of target acquisition, $t_o$, is computed according to the relationship $$h_o' = \sqrt{R_o^2 - X_o^2}$$

where $R_o$, the slant range of the target at $t_o$, is derived from a mapping radar through a holding device, and the initial value of the altitude over the target $h_o'$ at the time of target acquisition, $t_o$ prior to updating, is taken from an altimeter. A logic circuit selects the proper altitude $h_o$ from the two alternatives and then $h$, the altitude at time $t$, is computed according to the relationship $$h = h_o - \int_{t_o}^{t} V_v\, dt$$

where $V_v$ is the vertical component of the aircraft's velocity supplied from the ground velocity source and is used to perform the computation $$X = \sqrt{R^2 - h^2}$$

3 Claims, 1 Drawing Figure

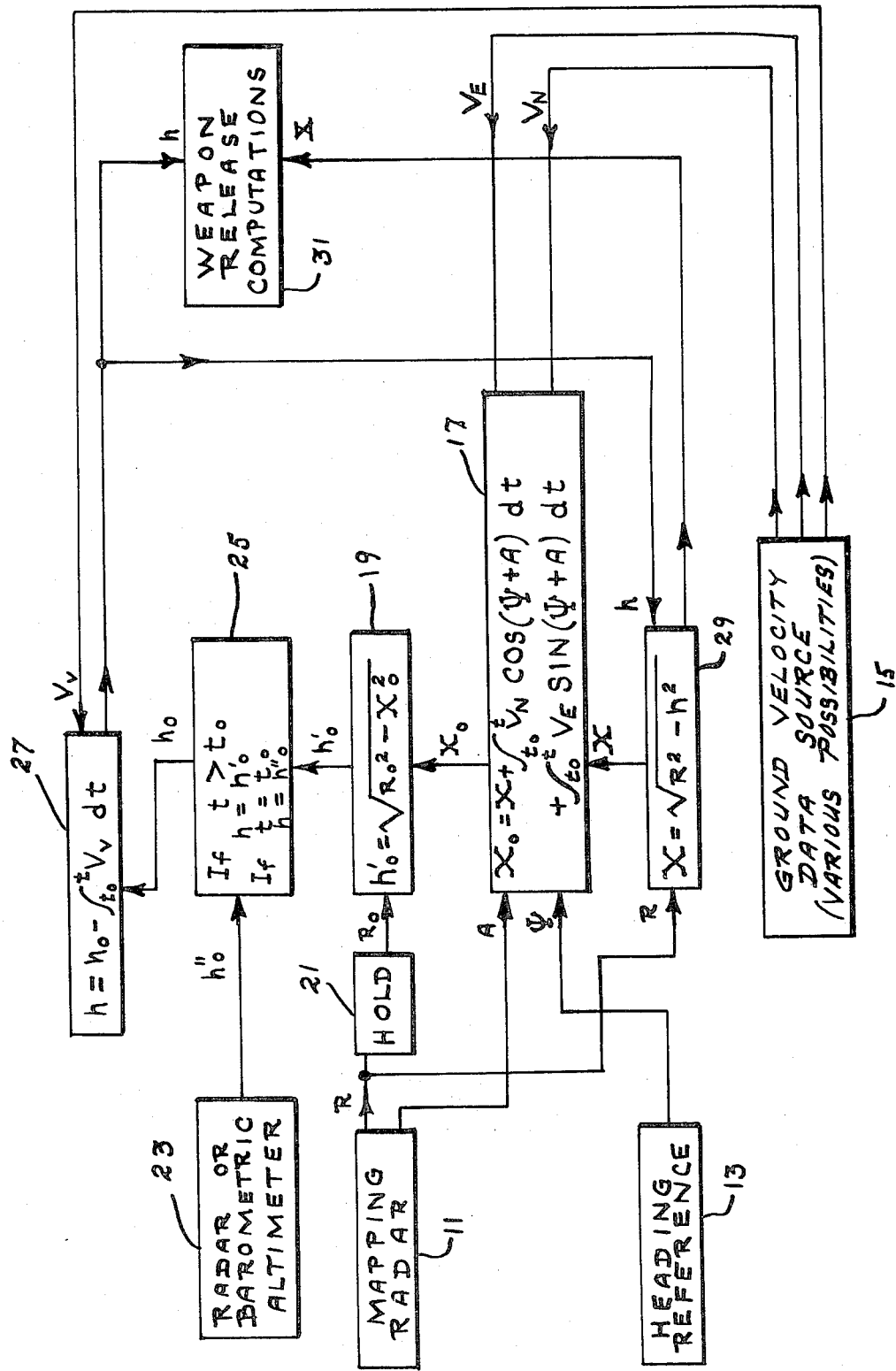

METHOD AND SYSTEM FOR COMPUTING ALTITUDE OVER A TARGET AND THE HORIZONTAL RANGE THEREOF

BACKGROUND OF THE INVENTION

This invention relates to bomb delivery computations, and more particularly to the determination of the altitude over a target and the horizontal range thereof.

Large errors frequently occur in bomb deliveries using a mapping radar even if the mapping radar is of high precision. The basic reason is that the only sources of altitude data used are the barometric altimeter and the radar alimeter. Neither of these measure the altitude over the target. Hence the use of such altitude data in bomb release computations, one of which is the computation of horizontal range, results in large miss distances.

Radar altimeters measure altitude above the point on the ground directly below the aircraft. What is required for bomb release computations, however, is altitude over the target. Consequently, terrain roughness often causes large errors in bomb release computations in which raw radar altitude data is used. One of the bomb release computations is the computation of horizontal range from altitude and from slant range.

Nor do barometric altimeters measure altitude above the target; they measure altitude above mean sea level. Consequently errors in target altitude above mean sea leavel often cause large errors in bomb release computations in which raw barometric altitude data are used.

The advent of airborne digital computers, such as the Westinghouse AN/AYK-8, has made it possible to eliminate the effects of both terrain roughness and errors in target altitude above mean sea on bomb release computations. This can be done by computing altitude over the target, rather than using a raw sensor output.

SUMMARY OF THE INVENTION

To perform the computation, the following set of equations or an equivalent set, is programmed in a digital computer for numerical solution.

$$R^2 = X^2 + h^2$$
$$R_o^2 = X_o^2 + h_o^2$$

$$X - X_o = -\int_{t_0}^{t} V_E \cos(\psi+A)\,dt - \int_{t_0}^{t} V_E \sin(\psi+A)\,dt$$

$$h - h_o = -\int_{t_0}^{t} V_v\,dt$$

where $R$ = slant range to the target at the present time. R is measured by means of mapping radar. It is used only in that cycle of computation which occurs at the present time $t$.

$R_o$ = slant range to the target at the time of acquisition of the target, $t_o$. $R_o$ is measured by the mapping radar and stored in the computer for use in all subsequent cycles of computation;

$\psi$ = aircraft heading at the present time t measured by means of the heading reference. It is used only in that cycle of computation which occurs at the present time $t$;

$A$ = azimuth angle of the target relative to the aircraft heading axis at the present time $t$, measured by means of the mapping radar;

$V_N$ = north component of aircraft ground velocity;

$V_E$ = east component of aircraft ground velocity; and $V_v$ = vertical component of ground velocity (positive downward).

It is therefore an object of the invention to provide a novel and improved system for determining altitude over a target for bomb delivery using a mapping radar.

It is another object to provide a method and system for determining altitude over a target for bomb delivery that is accurate even over areas where the terrain is rough.

These and other objects, advantages and features of the invention will become more apparent from the following description taken in conjunction with the illustrative embodiment of the accompanying drawings.

DESCRIPTION OF THE DRAWINGS

The sole FIGURE is a block and flow diagram showing an embodiment of the invention.

DETAILED DESCRIPTION OF THE PREFERRED EMBODIMENT

Referring now to the sole FIGURE, mapping radar 11 supplies the slant range R to the target and the azimuth angle A of the target relative to the aircraft heading, both values being taken at a present time t. Heading reference source 13 provides aircraft heading $\psi$ at time $t$. Ground velocity data source 15, of which there are many possibilities, provides the aircraft vertical velocity $V_v$ and the north component $V_N$ and the east component $V_E$ of the ground velocity. Using the values of A, $\psi$, $V_N$ and $V_E$ together with the horizontal range to the target X at time t the relationship in box 17 is computed to obtain $X_o$, the horizontal range at time of target acquisition $t_o$.

The height of the target $h_o'$ when $t = t_o$ is computed from the relationship shown in box 19 which uses the previously computed $X_o$ and $R_o$, the slant range to the target at $t_o$, which is obtained from mapping radar 11 through holding circuit 21.

The altitude over the target, $h_o$, when $t = t_o$, is determined by altimeter 23 which can be either a radar altimeter or a barometric altimeter. When $t > t_o$, an updated value of $h_o$ is computed by means shown in box 19. Logic circuit 24 then selects the proper value of the altitude $h_o$ over the target at $t_o$ depending on whether $t > 0$ or $t = t_o$. The altitude $h$ over the target at the present time $t$ is computed according to the relationship shown in box 27 utilizing the vertical velocity $V_v$ supplied by ground velocity data source 15. The horizontal range X at present time t is computed according to the relationship shown in box 29 utilizing the previously computed value of altitude $h$ and slant range R taken from mapping radar 11. The values of h and $x$ can then be used in air-to-ground computations. Although the quantities $X_o$ and $h_o$ are constants, the estimates of these quantities are contaminated by sensor errors. The more often the estimates are updated, i.e., the longer the process runs, the more accurate they become.

Although $h_o$ and $X_o$ are not needed in weapon release computations, they are needed to compute estimates for $h$ and $x$, the current values of altitude and horizontal range. Since h and X are needed in weapon release computations, errors in $h_o$ and $X_o$ do affect weapon release computations, albeit indirectly. Consequently, the errors in $h_o$ and $X_o$ are important.

What is claimed is:

1. A system for computing altitude over a target and horizontal range thereof from an aircraft comprising:
   a. mapping radar having azimuth output A and slant range output R at a present time t;
   b. a source of heading reference $\psi$;
   c. a ground velocity data source having outputs of vertical velocity $V_v$ and north and east components of ground velocity $V_N$ and $V_E$ respectively of the aircraft;
   d. a first means for computing the horizontal range $X_o$ at a time of acquisition $t_o$ according to the relationship $$X_o = X + \int_{t_o}^{t} V_N \cos(\psi + A)\,dt + \int_{t_o}^{t} V_E \sin(\psi + A)\,dt$$

the first horizontal range computing means being fed by the azimuth output A from the mapping radar, the heading reference source, and the ground velocity data source;
   e. means for holding the slant range R producing the output $R_o$ at time $t_o$;
   f. a first means for computing height $h_o'$ according to the relationship $$h_o' = \sqrt{R_o^2 - X_o^2}$$

the first height computing means being fed by the holding means and the first horizontal range computing means;
   g. an altimeter;
   h. means for logical selection of the outputs of the altimeter and the first height computing means the selection depending respectively upon the equality of the present time t and the acquisition time $t_o$ or t being greater than $t_o$;
   i. a second means for computing height h according to the relationship $$h = h_o - \int_{t_0}^{t} V_v\,dt$$

the second height computing means being fed by the ground velocity data source and logical selection means; and
   j. a second means for computing the horizontal range X at present time t according to the relationship $$X = \sqrt{R^2 - h^2}$$

the second horizontal range computing means being fed by the mapping radar and the second height computing means.

2. An altitude and range computing system according to claim 1 wherein the altimeter is a radar.

3. An altitude and computing system according to claim 1 wherein the altimeter is a barometer.

* * * * *